United States Patent [19]

Wilson et al.

[11] Patent Number: 5,573,071
[45] Date of Patent: Nov. 12, 1996

[54] APPARATUS FOR CULTIVATING SOIL ON TERRAIN WITH STEEP SLOPES

[75] Inventors: Donald J. Wilson, Butte; Troy C. Smith, Whitehall, both of Mont.

[73] Assignee: Golden Sunlight Mines, Inc., Whitehall, Mont.

[21] Appl. No.: 399,919

[22] Filed: Mar. 7, 1995

[51] Int. Cl.⁶ ................................................. A01C 3/06
[52] U.S. Cl. .................................. 172/438; 239/663
[58] Field of Search ........................... 37/405, 406, 407, 37/195; 172/199, 438; 111/52, 131, 132, 133, 11, 903, 923, 924; 239/663, 650; 180/6.7, 9, 9.48

[56] References Cited

U.S. PATENT DOCUMENTS

| | | | |
|---|---|---|---|
| 2,760,686 | 8/1956 | Maze | 111/8 X |
| 3,512,598 | 5/1970 | Shatoska et al. | 180/9.48 |
| 3,605,903 | 9/1971 | McDonald et al. | |
| 3,828,702 | 8/1974 | Bowman | 111/130 X |
| 4,116,140 | 9/1978 | Anderson et al. | |
| 4,438,710 | 3/1984 | Paladino | |
| 4,491,275 | 11/1985 | Holsworth | 239/663 |
| 5,076,378 | 12/1991 | Lagacé | 180/6.7 X |
| 5,323,720 | 6/1994 | Moore, Jr. | 111/8 |

OTHER PUBLICATIONS

Herd Sure-Fead Broadcaster Model 750 brochure, Herd Seeder company (May 1993).
Herd Sure-Feed Broadcaster Installation Instructions, Herd Seeder Company (Sep. 1975).
IMC 3700 C Groomer product sheet, Logan Manufacturing Company (no date).

Primary Examiner—Terry Lee Melius
Assistant Examiner—Robert Pezzuto
Attorney, Agent, or Firm—Flehr, Hohbach, Test, Albritton & Herbert

[57] ABSTRACT

Apparatus for cultivating soil and sowing and bedding seed and/or fertilizer on steep slopes. A tractor comprises a chassis which is supported for movement along a path over terrain by endless tracks. The tracks have lateral widths which are optimum relatively to the overall width of the tractor to enable operation of the apparatus over steep grades. A scraper blade is carried on the front end of the chassis, and a seed/fertilizer broadcaster is mounted on the scraper blade. A harrow for working and bedding soil is mounted on the rear end of the chassis. The tractor can be configured in different modes with the scraper and/or the harrow in either up or down positions while the broadcaster is either turned on or off.

4 Claims, 2 Drawing Sheets

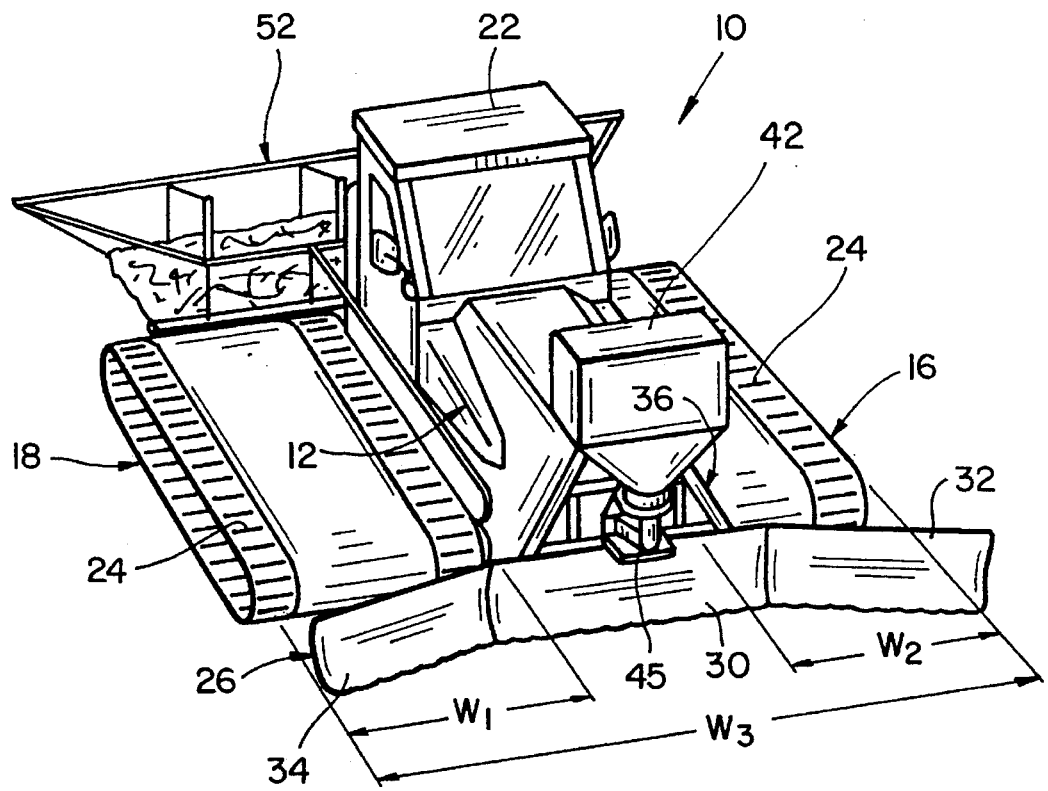
FIG_1
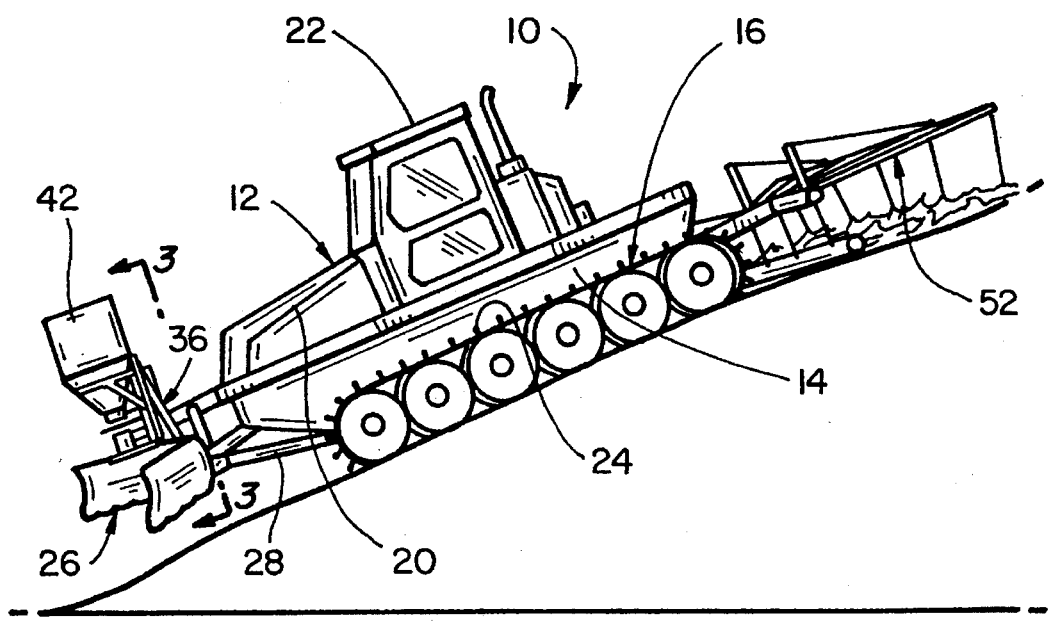
FIG_2

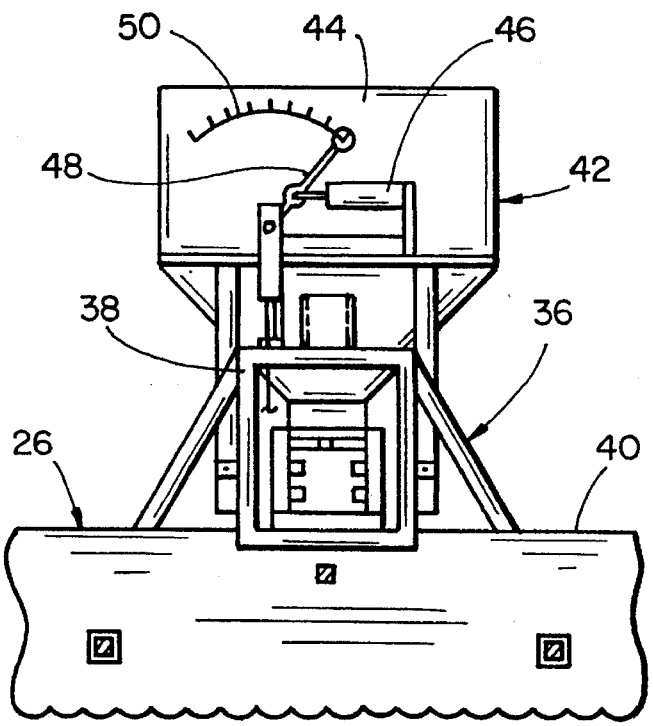
FIG_3
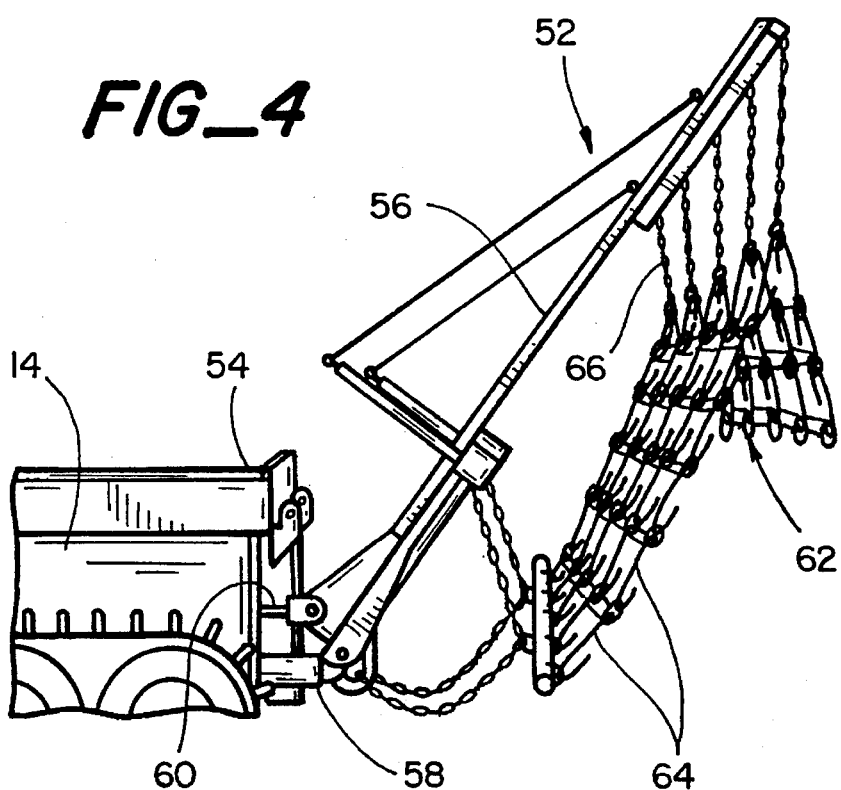
FIG_4

APPARATUS FOR CULTIVATING SOIL ON TERRAIN WITH STEEP SLOPES

BACKGROUND OF THE INVENTION

1. Field of the Invention

This invention relates in general to the cultivation of soil. More particularly, the invention relates to cultivating, seeding and fertilizing soil on terrain with steep slopes.

2. Description of the Related Art

In the prior art various types of apparatus have been used for cultivating or tilling soil. Endless track type vehicles mounted with scraper blades have been used to cultivate soil on various types of terrain. Rubber tired or endless track type tractors have also been used to pull tillage implements, such as plows and harrows, to prepare and work soil for subsequent fertilization and planting operations.

For sowing and bedding grass seed onto relatively level terrain the typical conventional procedure involves first cultivating the soil with a tractor having the appropriate tillage implement and then driving the same or different tractor over the cultivated soil to broadcast seed and/or spread fertilizer onto the soil. A conventional tractor can also be used to pull a harrow or other soil tillage implement to smooth the soil and/or bed the seed and fertilizer into it.

Conventional rubber tired or crawler type apparatus for the cultivation, sowing, fertilizing and bedding operations are not suited for use on terrain with steep slopes, such as slopes of 50% or more grades. A conventional crawler type bulldozer, for example, when operating on grades above about 50% must move in a direction parallel to the slope, i.e. either uphill or downhill, for safety purposes. Such a dozer cannot operate on 100% (45°) grades. On grades on the order of 50% the conventional dozers in a sidehill orientation, i.e. perpendicular to the slope, either cannot operate at all or do so in a highly unsafe mode.

Hydroseeding is the principal conventional method for sowing grass seed onto steep slopes. In the hydroseeding method a mixture of seed and water is pumped through a nozzle to spread the mixture over the slopes. However, the hydroseeding method is relatively expensive, and because of equipment limitations such as the requisite tank truck, pump and hose the area of application is limited to about a 100-foot radius from the hose nozzle.

The need has been recognized for soil cultivating apparatus which obviates the foregoing and other limitations and disadvantages of prior art cultivation apparatus and procedures. Despite the various cultivation apparatus in the prior art, there has heretofore not been provided a suitable and attractive solution to these problems.

OBJECTS AND SUMMARY OF THE INVENTION

It is a general object of the invention to provide new and improved apparatus for cultivating soil on steep slopes and which also incorporates or beds seed and/or fertilizer into the cultivated soil.

Another object is to provide apparatus of the type described which can operate on steep slopes for cultivating soil while also broadcasting seed and/or fertilizer and working the soil to bed the broadcasted seed or fertilizer.

The invention in summary provides apparatus which includes a tractor comprising a chassis with endless tracks having an optimum lateral width relative to the overall track width for operating the tractor over steep slopes. The apparatus carries scraper blade means for scraping and pushing the soil, broadcaster means for broadcasting seed or fertilizer onto the soil, and harrow means for working the soil and to bed the broadcasted seed or fertilizer.

The foregoing and additional objects and features of the invention will appear from the following specification in which the several embodiments have been set forth in detail in conjunction with the accompanying drawings.

BRIEF DESCRIPTION OF THE DRAWINGS

FIG. 1 is a perspective view of cultivator apparatus in accordance with one preferred embodiment of the invention.

FIG. 2 is a side elevational view of the apparatus of FIG. 1 showing one mode of operation on a steep slope.

FIG. 3 is a fragmentary cross sectional view taken along the line 3—3 of FIG. 2.

FIG. 4 is a fragmentary side elevation view of the rear end of the apparatus of FIG. 1.

DESCRIPTION OF THE PREFERRED EMBODIMENTS

In the drawings FIGS. 1 and 2 illustrate generally at 10 cultivator apparatus incorporating one embodiment of the invention. Apparatus 10 comprises an endless track type tractor 12 having a chassis 14 which is supported for movement over the terrain by left and right endless tracks 16 and 18. A suitable engine, not shown, within hood 20 at the front end of the tractor drives the tracks through a drive train and transmission, not shown. The tractor operator is stationed within a cab 22 at the center of the chassis.

The right and left endless tracks have respective lateral widths $W_1$ and $W_2$ which are optimum relative to the overall lateral track width $W_3$ of the tractor. This optimum relationship is important to provide stability and traction on steep slopes, such as slopes of from 50% to 100% grades. Preferably the relationship between the individual and overall track widths is $W_1+W_2$ in the range of 65% to 80%, and preferably 75%, of $W_3$. As a specific example, where the overall track $W_3$ is 149" then each individual track width $W_1$ and $W_2$ can optimally be 57".

The individual tracks 16 and 18 can be comprised of heavy-duty multiple ply polyester material. A plurality of heat treated steel cleats 24 are transversely mounted on the outside of the multiple ply on each track. The wide track vehicle sold under the designation LMC 3700C by Logan Manufacturing Company of Logan, Utah is suitable for use as the tractor in the present invention, with the modifications hereinafter described. The LMC 3700C tractor is conventionally used to operate on snow for grooming ski slopes, such as to pack, push and till snow.

A scraper blade 26 is mounted on the end of a pair of support arms 28 which are pivotally mounted on the front end of the chassis. Suitable remotely controlled hydraulic rams, not shown, are connected with the support arms to raise and lower the scraper blade. Scraper blade 26 is comprised of a center portion 30 which is mounted directly to the support arms and includes left and right side wings 32, 34 mounted on the center portion.

A support frame 36, best shown in FIG. 3, is mounted on blade center portion 30. The support frame includes an upright portion 38 which extends above upper edge 40 of the blade. A seed/fertilizer broadcaster 42 is mounted on upright portion 38 for spreading seed and/or fertilizer, which is granular. Broadcaster 42 comprises a hopper 44 for containing a supply of the seed and/or fertilizer. The supply can advantageously comprise a mixture of fertilizer and the desired seeds, such as grass seed and barley seed. As desired the hopper could be filled first with fertilizer and then with the seed mixture for separate spreading operations.

Broadcaster 42 also includes a fan-type spreader 45 (FIG. 1) at the lower discharge opening (not shown) of the hopper for spreading the seed/fertilizer outwardly along the path of movement of the tractor. A control plate, also not shown, is mounted for sliding movement across the hopper discharge opening for selectively controlling the rate of discharge of the seed and/or fertilizer. An hydraulic cylinder 46, operated by a suitable remote hydraulic control from cab 22, is mounted on the rear of the hopper for adjusting the position of the control plate and thereby control the rate of seed/fertilizer discharge. An indicator arm 48 attached to the rod end of actuator pivots through an arc along gradated gauge indicia 50 on the rear of the hopper to provide a visual indication to the operator of the control plate position and thereby the rate of discharge. The broadcaster sold under the name Herd™ model 750 by Herd Seeder Company, Inc. of Logansport, Ind. can be advantageously used in the present invention.

Soil working and bedding means 52 is provided at the rear end 54 of the chassis for working soil along the path of tractor movement and to bed the broadcasted seed/fertilizer into the soil. As used herein in relation to soil, the word "working" means to level and/or break up soil, and the words "bed" and "bedding" mean to incorporate seed and/or fertilizer into the soil. The soil working and bedding means comprises a detachable frame 56 mounted on the tractor's draw bar 58 which extends from the rear end of the chassis. Frame 56 is pivoted about a horizontal axis from the lowered position shown in FIG. 2 to the raised position shown in FIG. 4 by means of an hydraulic cylinder of which the rod end 60 is shown coupled to the frame. A meadow drag type harrow 62 comprising a plurality of interconnected metal links 64, is suspended by chains 66 below frame 56. It is understood that other suitable harrow implements could be used for the working and bedding operations.

In the operation and use of the invention, apparatus 10 is driven to the desired area of the terrain to be cultivated. The apparatus can be used in several different modes, depending upon the particular conditions and desired results. In one mode, scraper blade 26 is pivoted down to its lowered position while harrow 62 is pivoted up and broadcaster 42 is turned off. As the tractor moves forward in this mode, the blade can be used for grading by scraping and pushing soil along the path of movement. In another mode, both the scraper blade and harrow are pivoted down, while the broadcaster is turned off. As the tractor moves forward in this mode, the blade can be used for scraping and pushing the soil while the harrow is used for leveling, breaking up and smoothing the soil. In another mode the blade is pivoted up while the harrow is down and the broadcaster is turned on. In this mode a mixture of seed and fertilizer is broadcast outwardly from the tractor onto the soil along the path, and this is followed by the simultaneous working action of the harrow to incorporate or bed the seed and fertilizer into the soil. In yet another mode both the scraper blade and harrow can be down while the broadcaster is turned on so that the grading, seed/fertilizer broadcasting and soil working/bedding are carried out in one operation.

During operation, tractor 12 can be safely driven in the uphill or downhill directions on slopes of up to about a 100% grade, and in sidehill directions on slopes of up to about a 50% grade. The apparatus of the invention permits the soil on these steep slopes to be smoothed and tilled while at the same time applying and bedding seed and fertilizer into the soil. The invention thereby enables areas to be reseeded faster and more cost effectively as compared to methods, such as hydroseeding, that are conventionally used for reseeding steep slopes. The apparatus of the invention, when configured in the mode with only the scraper blade lowered for operation, also facilitates constructing erosion control basins on steep slopes with the blade.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. Apparatus for cultivating soil on terrain with steep slopes while sowing and bedding granular material into the soil, the apparatus comprising the combination of a tractor which includes a chassis extending lengthwise between first and second ends, and track means mounted on the chassis for supporting the apparatus for movement along a path over the terrain, said track means comprising first and second endless tracks carried on opposite sides of the chassis, said first and second endless tracks having respective lateral widths of $W_1$ and $W_2$ and with the track means having an overall lateral width $W_3$, and further wherein $W_1$ plus $W_2$ is in the range of 65% to 80% of $W_3$; a support structure having a pair of arms mounted on the chassis with said arms having distal ends extending forwardly from said first end; a scraper blade carried on the distal ends of the arms for scraping and pushing soil along the path; broadcaster means carried on the scraper blade for broadcasting the material outwardly from the tractor along the path and onto the soil; and soil working and bedding means carried by said second end of the chassis for working the soil along the path and for bedding the broadcasted material into the soil.

2. Apparatus as in claim 1 in which said scraper blade means comprises a scraper blade having a center portion with a lower edge adapted for engaging the soil and an upper edge; a support frame carried on said center portion with the support frame having an upright portion which extends above the upper edge; and said broadcaster means is carried on said upright portion of the support frame.

3. Apparatus as in claim 1 in which said tractor includes a draw bar mounted on the second end of the chassis; means for mounting the soil working and bedding means on the draw bar; and means for selectively raising and lowering the soil working and bedding means relative to the chassis.

4. Apparatus as in claim 1 in which said soil working and bedding means comprises a harrow.

\* \* \* \* \*